United States Patent
Lim et al.

(10) Patent No.: US 10,069,403 B1
(45) Date of Patent: Sep. 4, 2018

(54) POWER SUPPLY WITH LOW POWER STANDBY MODE HAVING FIXED BURST-ON TIME AND ADAPTIVE LLC BURST FREQUENCY ADJUSTMENT

(71) Applicant: Infineon Technologies Austria AG, Villach (AT)

(72) Inventors: Shu Fan Lim, Singapore (SG); Dong Li, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/614,888

(22) Filed: Jun. 6, 2017

(51) Int. Cl.
*H02M 3/335* (2006.01)
*H02M 1/42* (2007.01)
*H02M 1/00* (2006.01)

(52) U.S. Cl.
CPC ..... *H02M 1/4208* (2013.01); *H02M 3/33546* (2013.01); *H02M 2001/0032* (2013.01)

(58) Field of Classification Search
CPC . H02M 2001/0032; H02M 2001/0035; H02M 1/4241; H02M 1/4258; H02M 3/33523
USPC ............... 363/21.02, 21.03, 21.08, 22–25
See application file for complete search history.

(56) References Cited

U.S. PATENT DOCUMENTS

| | | | | |
|---|---|---|---|---|
| 2007/0139984 A1* | 6/2007 | Lo | ............... | H02M 1/4216 363/89 |
| 2008/0198638 A1* | 8/2008 | Reinberger | ......... | H02M 3/3376 363/74 |
| 2012/0250360 A1* | 10/2012 | Orr | ............... | H02M 3/3376 363/21.02 |
| 2012/0250378 A1* | 10/2012 | Kok | ............... | H02M 3/156 363/78 |
| 2013/0229829 A1* | 9/2013 | Zhang | ............... | H02M 3/33569 363/16 |
| 2014/0009978 A1* | 1/2014 | Brinlee | ............... | H02M 1/4225 363/25 |
| 2016/0057822 A1* | 2/2016 | Chu | ............... | H02M 1/4208 315/201 |

OTHER PUBLICATIONS

"AN11179—TEA1716 resonant power supply control IC with PFC", NXF Semiconductors, Application note, Rev. 1, Jan. 9, 2013.
"IDP2303—Digital Multi-Mode PFC + LLC Combo Controller", Infineon Technologies AG, Datasheet, Edition 2017-02-0630, Rev. V2.0, Mar. 21, 2017.
"IDP2303A—Digital Multi-Mode PFC + LLC Combo Controller", Infineon Technologies AG, Datasheet, Edition Dec. 14, 2016, Rev. V2.0, Mar. 23, 2017.
"TEA1716T—Resonant power supply control IC with PFC", NXP Semiconductors, Product data sheet, Rev. 3, Nov. 30, 2012.

* cited by examiner

*Primary Examiner* — Gary Nash
(74) *Attorney, Agent, or Firm* — Murphy, Bilak & Homiller, PLLC

(57) ABSTRACT

A power supply includes a PFC (power factor correction) circuit, an LLC converter and a controller. The controller is operable to burst the LLC converter for a predefined burst on-time and at a default frequency when the power supply is in a low power standby mode, and adjust the frequency at which the LLC converter is switched during the predefined burst on-time based on load conditions and an input voltage to the LLC converter.

23 Claims, 5 Drawing Sheets

POWER SUPPLY WITH LOW POWER STANDBY MODE HAVING FIXED BURST-ON TIME AND ADAPTIVE LLC BURST FREQUENCY ADJUSTMENT

TECHNICAL FIELD

The present application relates to power supplies, in particular low power standby mode for power supplies.

BACKGROUND

Power supplies such as embedded power supplies and adapter power supplies for TV, PC, and server applications typically include a front-stage power factor correction (PFC) circuit and a second-stage LLC converter. PFC circuits counteract the distortion caused by non-linear devices such as rectifiers, and raise the power factor. LLC converters have a topology that utilizes a combination of two inductors and one capacitor ("LLC") on the primary side of the converter. A switching (full or half) bridge on the primary side generates a square waveform that excites the LLC tank circuit, which in response outputs a resonant sinusoidal current that is scaled and rectified by a transformer and rectifier circuit of the LLC converter. An output capacitor filters the rectified ac current and outputs a DC voltage.

Both the PFC and LLC stages are often controlled by a single digital power controller. In the case of TV adapter power supplies, the power supply must meet standby power consumption, output voltage ripple and dynamic response requirements during standby mode. For example, some TV adapter power supplies must have an input power consumption less than 270 mW at an output load of 152 mW, an output voltage ripple less than 190 mV (<1% of 19V output voltage), and an output voltage drop less than 0.95V (within ±5% of 19V output voltage) during load jumps from 0% to 100% load.

The characteristics of a conventional LLC converter make it difficult to meet standby power consumption, output voltage ripple and dynamic response requirements for power supplies such as TV, PC and server adapter power supplies. If the LLC converter is operating at a fixed switching frequency (LLC burst frequency) in low power standby mode that is selected based on certain input voltage and standby load conditions, the output voltage ripple at other input voltage and standby load conditions may not meet the requirements. Different LLC gains and/or overly long burst-on time leads to excessive delivery of energy. In addition, the secondary-side control may saturate, leading to slower dynamic response to load changes, larger output voltage drop and higher standby power losses in the secondary side control circuitry. These problems worsen when resonant component tolerances are considered.

SUMMARY

Embodiments described herein provide low power standby mode control for power supplies such as embedded power supplies and adapter power supplies. The low power standby mode control satisfies standby power consumption, output voltage ripple and dynamic response requirements for the power supply under resonant component tolerances, different standby loads and different input voltages.

According to an embodiment of a method of operating a power supply that includes a PFC (power factor correction) circuit and an LLC converter, the method comprises bursting the LLC converter for a predefined burst on-time when the power supply is in a low power standby mode. Bursting the LLC converter for the predefined burst on-time comprises: decreasing a switching frequency of the LLC converter from a first frequency value to a second frequency value over one or more fixed time intervals at the beginning of the predefined burst on-time; switching the LLC converter at the second frequency value over one or more of the fixed time intervals after decreasing the switching frequency; and increasing the switching frequency of the LLC converter from the second frequency value to a third frequency value over one or more of the fixed time intervals at the end of the predefined burst on-time.

According to an embodiment of a power supply, the power supply comprises a PFC circuit, an LLC converter and a controller operable to burst the LLC converter for a predefined burst on-time when the power supply is in a low power standby mode. The controller is operable to burst the LLC converter for the predefined burst on-time by: decreasing a switching frequency of the LLC converter from a first frequency value to a second frequency value over one or more fixed time intervals at the beginning of the predefined burst on-time; switching the LLC converter at the second frequency value over one or more of the fixed time intervals after decreasing the switching frequency; and increasing the switching frequency of the LLC converter from the second frequency value to a third frequency value over one or more of the fixed time intervals at the end of the predefined burst on-time.

According to an embodiment of a controller for a power supply that includes a PFC circuit and an LLC converter, the controller comprises a fixed burst-on time unit operable to burst the LLC converter for a predefined burst on-time when the power supply is in a low power standby mode. The fixed burst-on time unit is operable to burst the LLC converter for the predefined burst on-time by: decreasing a switching frequency of the LLC converter from a first frequency value to a second frequency value over one or more fixed time intervals at the beginning of the predefined burst on-time; switching the LLC converter at the second frequency value over one or more of the fixed time intervals after decreasing the switching frequency; and increasing the switching frequency of the LLC converter from the second frequency value to a third frequency value over one or more of the fixed time intervals at the end of the predefined burst on-time.

According to another embodiment of a method of operating a power supply that includes a PFC circuit and an LLC converter, the method comprises: bursting the LLC converter for a predefined burst on-time and at a default frequency when the power supply is in a low power standby mode; and adjusting the frequency at which the LLC converter is switched during the predefined burst on-time, based on load conditions and an input voltage to the LLC converter.

According to another embodiment of a power supply, the power supply comprises a PFC circuit, an LLC converter and a controller operable to burst the LLC converter for a predefined burst on-time and at a default frequency when the power supply is in a low power standby mode, and adjust the frequency at which the LLC converter is switched during the predefined burst on-time based on load conditions and an input voltage to the LLC converter.

According to another controller for a power supply that includes a PFC (power factor correction) circuit and an LLC converter, the controller comprises an adaptive LLC burst frequency unit operable to burst the LLC converter for a predefined burst on-time and at a default frequency when the power supply is in a low power standby mode, and adjust the frequency at which the LLC converter is switched during the predefined burst on-time based on load conditions and an input voltage to the LLC converter.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide a low power standby mode control methodology that meets stringent standby power consumption, output voltage ripple and dynamic response requirements for power supplies, even for different resonant component tolerances, different standby loads and different input voltages.

The low power standby mode control methodology includes a fixed burst-on time technique in which the LLC converter of a power supply is switched for a predefined burst on-time when the power supply is in a low power standby mode. The fixed burst-on time technique involves decreasing the switching frequency of the LLC converter from a first frequency value to a second frequency value at the beginning of the predefined burst on-time, switching the LLC converter at the second frequency value after decreasing the switching frequency, and subsequently increasing the switching frequency of the LLC converter from the second frequency value to a third frequency value at the end of the predefined burst on-time.

The low power standby mode control methodology also includes an adaptive LLC burst frequency adjustment technique. The adaptive LLC burst frequency adjustment technique involves adjusting the default frequency at which the LLC converter is switched during the predefined burst on-time, based on load conditions and the input voltage to the LLC converter. This way, the frequency at which the LLC converter is switched during the predefined burst on-time is a function of load conditions and LLC converter input voltage.

The fixed burst-on time and adaptive LLC burst frequency adjustment techniques can be used together or in isolation. That is, a power supply modified with the low power standby mode control methodology described herein can implement just the fixed burst-on time technique, just the adaptive LLC burst frequency adjustment technique or both the fixed burst-on time and the adaptive LLC burst frequency adjustment techniques.

Figure 1:
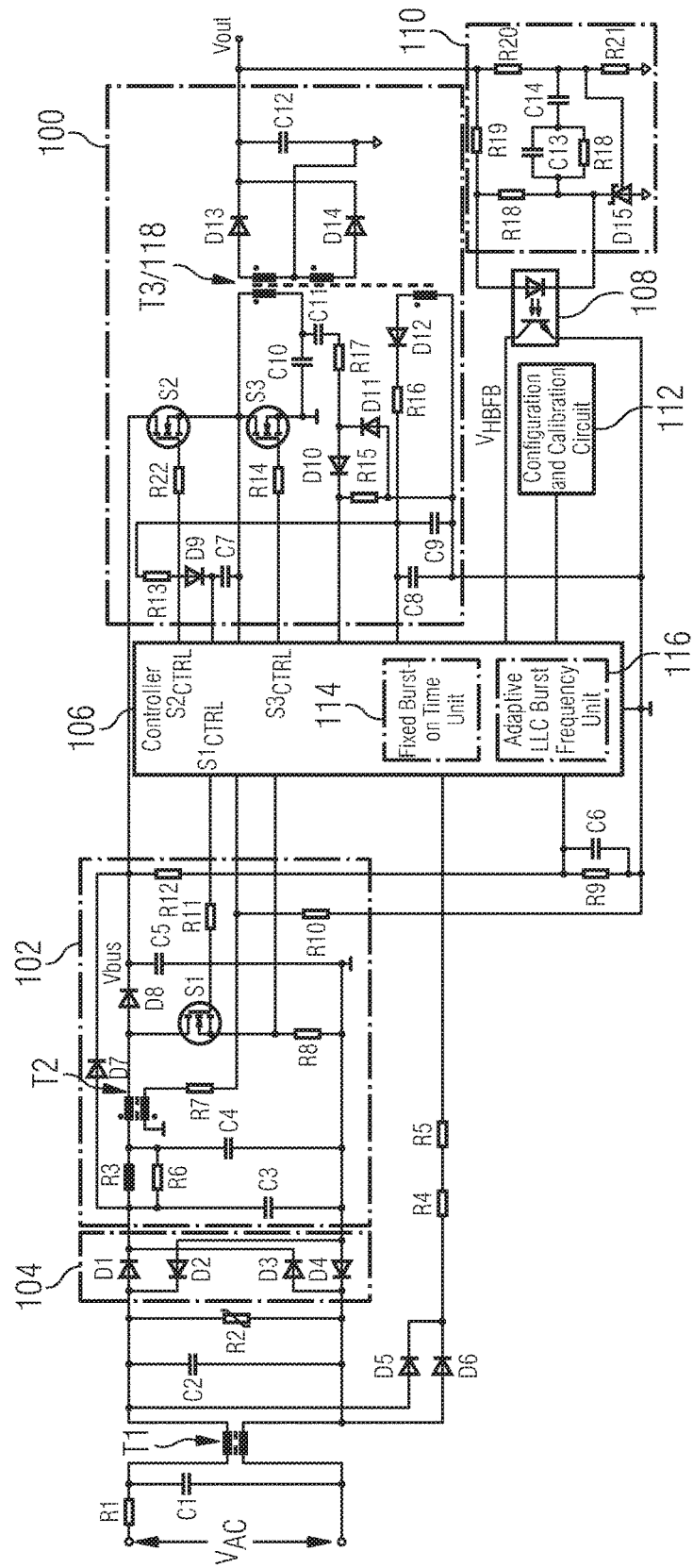
FIG. 1 illustrates a block diagram of an embodiment of a power supply that implements a low power standby mode control methodology.

FIG. 1 illustrates an embodiment of a power supply such as embedded power supply, an adapter power supply for TV, PC or server applications, etc. The power supply comprises an LLC converter 100, a PFC (power factor correction) circuit 102 and a diode bridge rectifier 104 coupled between the PFC circuit 102 and an AC input source $V_{AC}$. Various resistors R1-R22, capacitors C1-C14, diodes D1-D15 and transformers T1-T3 form standard parts of the power supply. The function/purpose of these power supply components are well known and therefore not described in further detail, unless pertinent to the fixed burst-on time and adaptive LLC burst frequency adjustment techniques described herein.

Operation of the PFC circuit 102 is controlled by a controller 106, which also controls the LLC converter 100. The controller 106 receives voltage feedback information ($V_{HBFB}$) from the secondary side of the LLC converter 100 via an optocoupler or similar circuit 108 and feedback circuitry 110 on the secondary side. The controller 106 may also receive configuration and calibration information from a configuration and calibration circuit 112 included in or associated with the controller 106. The configuration and calibration circuit 112 may store various configuration and calibration parameters such as voltage threshold levels, current threshold levels, frequency threshold levels, power thresholds, etc. which are used by the controller 106 in controlling the LLC converter 100 and the PFC circuit 102. The controller 106 generates a control signal $S1_{CTRL}$ for controlling switch device S1 of the PFC circuit 102, and respective control signals $S2_{CTRL}$ and $S3_{CTRL}$ for controlling high-side and low-side switch devices S2 and S3 of the LLC converter 100.

The primary side of the LLC converter 100 is configured in a half bridge configuration in FIG. 1, where switch device S2 is the high-side switch of a switching half bridge and switch S3 is the low-side switch. The controller 106 includes a fixed burst-on time unit 114 for implementing the fixed burst-on time technique of the low power standby mode control methodology described herein, and includes an adaptive LLC burst frequency unit 116 for implementing the adaptive LLC burst frequency adjustment technique of the low power standby mode control methodology described herein. Operation of the fixed burst-on time unit 114 is described next in more detail with reference to FIG. 2, followed by a description of the adaptive LLC burst frequency unit 116.

Figure 2:
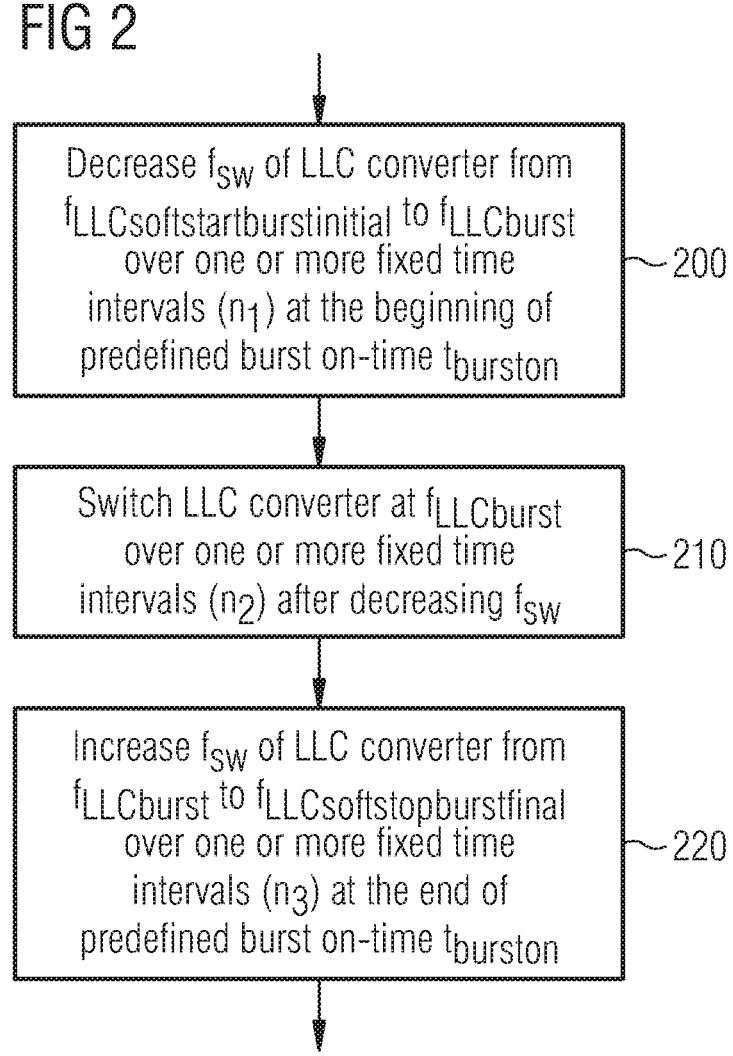
FIG. 2 illustrates a flow diagram of an embodiment of a fixed burst-on time technique of the low power standby mode control methodology.

FIG. 2 illustrates the fixed burst-on time technique implemented by the controller 106. The fixed burst-on time unit 114 of the controller 106 bursts the LLC converter 100 for a predefined burst on-time $t_{burston}$ on when the power supply is in a low power standby mode. Bursting involves switching the switches S2 and S3 of the LLC converter 100 for a fixed time period under light-load conditions when the output voltage Vout is unregulated. The fixed burst-on time unit 114 bursts the LLC converter 100 by decreasing the switching frequency $f_{SW}$ of the LLC converter 100 from a first frequency value $f_{LLCsoftstartburstinitial}$ to a second frequency value $f_{LLCburst}$ over one or more fixed time intervals $n_1$ at the beginning of the predefined burst on-time $t_{burston}$ (Block 200). The fixed burst-on time unit 114 then switches the LLC converter 100 at the second frequency value $f_{LLCburst}$ over one or more of the fixed time intervals $n_2$ after decreasing the switching frequency (Block 210). The fixed burst-on time unit 114 then increases the switching frequency $f_{SW}$ of the LLC converter 100 from the second frequency value $f_{LLCburst}$ to a third frequency value $f_{LLCsoftstartburstinitial}$ over one or more of the fixed time intervals $n_3$ at the end of the predefined burst on-time (Block 220).

Figure 3:
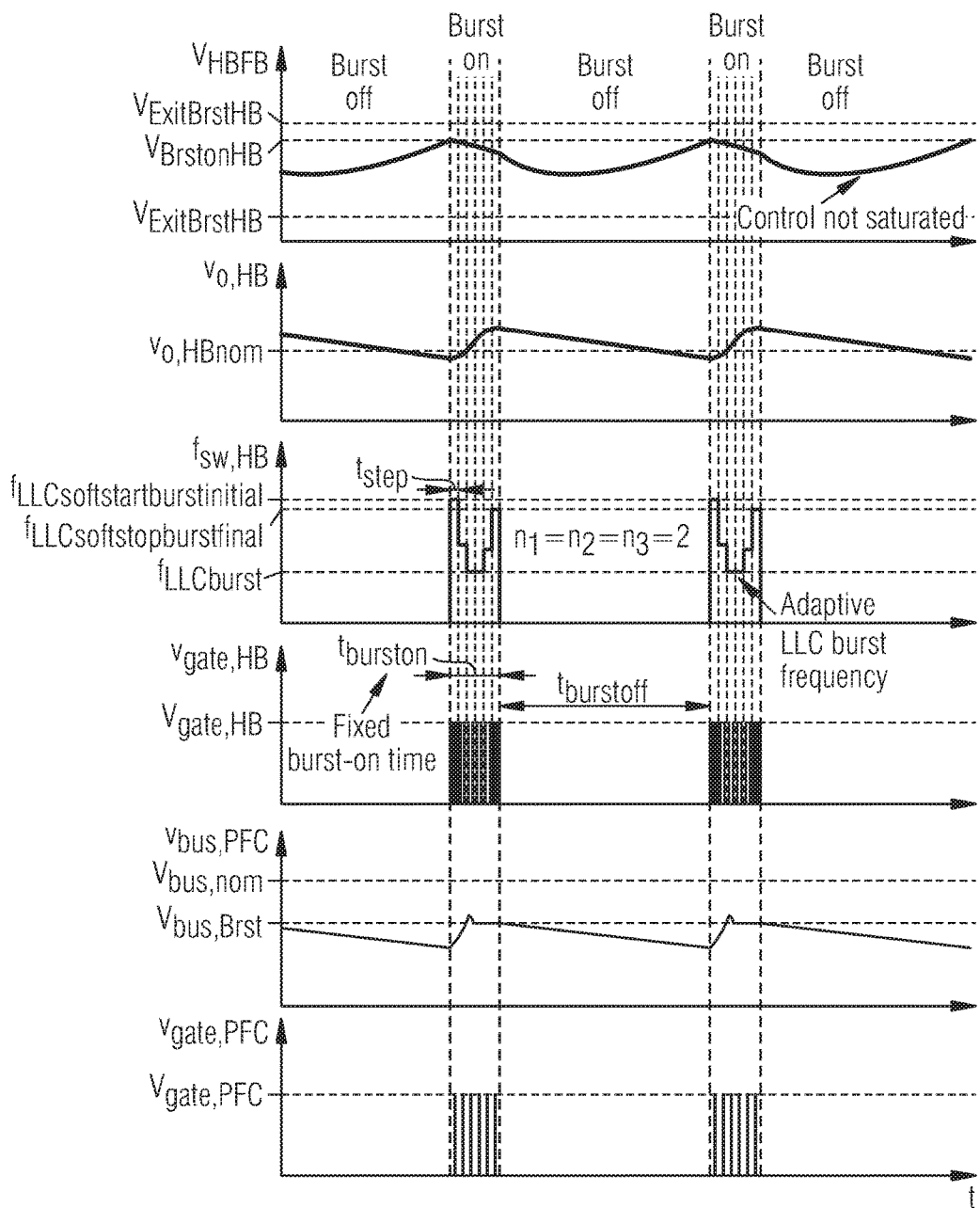
FIG. 3 illustrates various waveforms, voltage levels and frequency levels associated with the low power standby mode control methodology.

FIG. 3 illustrates various waveforms, voltage levels and frequency levels associated with operating the LLC converter in accordance with the fixed burst-on time technique shown in FIG. 2. The controller 106 starts bursting the LLC converter 100 (and optionally the PFC circuit 102) when $V_{HBFB} \geq V_{BrstonHB}$, where $V_{HBFB}$ is the measured secondary-side feedback voltage for the LLC converter 100 as provided by the optocoupler 108 and feedback circuitry 110, $V_{EntrBrstHB}$ is a voltage threshold for entering the burst mode, $V_{BrstonHB}$ is a voltage threshold in burst mode, and $V_{ExitBrstHB}$ is a voltage threshold for exiting the burst mode. The fixed burst-on time unit 114 of the controller 106 can include a comparator or similar circuitry/logic for determining when the condition $V_{HBFB} \geq V_{BrstonHB}$ is satisfied.

The controller 106 can burst the PFC circuit 102 synchronously with the LLC converter 102 for the same predefined burst on-time $t_{burston}$ as the LLC converter 100 in the low power standby mode, if the input voltage Vin of the PFC circuit 102 is lower than the output voltage Vbus of the PFC circuit 102. With a boost topology like PFC, the input voltage Vin of the PFC circuit 102 needs to be lower than the output voltage Vbus of the PFC circuit 102 for the PFC circuit 102 to burst properly with the LLC converter 100. In some cases, the controller 106 may set the PFC target output voltage lower in standby mode than in normal operating mode to reduce switching losses of both the PFC circuit 102 and the LLC converter 100. For example, the PFC target output voltage may be set to 350V in standby mode and 390V in normal operating mode. With the PFC target output voltage at 350V in standby mode, the controller 106 does not burst the PFC circuit 102 synchronously with the LLC converter 100 when the power supply input voltage $V_{AC}$ is 264 VAC and the input voltage Vin of the PFC circuit 102 is approximately 374V (peak of 264 VAC due to input filter caps) and is therefore higher than the PFC output voltage of 350V. FIG. 3 shows both the nominal ('$V_{bus,nom}$') and bursting ('$V_{bus,Brst}$') levels of the output voltage ('$V_{bus,PFC}$') of the PFC circuit 102, as well as the gate voltage ('$V_{gate,PFC}$') of switch S1 of the PFC circuit 102. With this approach, the controller 106 keeps the PFC circuit 102 and the LLC converter 100 bursting together as much as possible. However, the PFC circuit may not be bursting under some conditions to reduce power losses.

The controller 106 stops bursting the LLC converter 100 (and the PFC circuit 102 if bursting synchronously with the LLC converter 100) after the predefined burst-on time $t_{burston}$ as illustrated in FIG. 3. The digital control loop for the fixed burst-on time unit 114 of the controller 106 is run at fixed time steps of $t_{step}$. The predefined burst-on time $t_{burston}$ comprises $n_1$ counts of $t_{step}$ at the beginning of the predefined burst on-time $t_{burston}$, where there is a fast frequency ramp down from $f_{LLCsoftstartburstinitial}$ to $f_{LLCburst}$, $n_2$ counts of $t_{step}$ where the LLC converter 100 operates at a switching frequency of $f_{LLCburst}$, and $n_3$ counts of $t_{step}$ at the end of the predefined burst on-time $t_{burston}$ where there is fast frequency ramp from $f_{LLCburst}$ to $f_{LLCsoftstopburstfinal}$. Accordingly, the predefined burst-on time $t_{burston}$ is given by $t_{burston} = (n_1 + n_2 + n_3)^* t_{step}$. The switching frequency of the LLC converter 100 is labelled '$f_{SW,HB}$' in FIG. 3 and the gate voltage of switch S3 of the LLC converter 100 is labelled '$v_{gate,HB}$'.

The example illustrated in FIG. 3 has $n_1 = n_2 = n_3 = 2$. In this implementation example, there are 2 counts of $t_{step}$ at the beginning of the predefined burst on-time $t_{burston}$ where there is a fast frequency ramp down from $f_{LLCsoftstartburstinitial}$ to $f_{LLCburst}$, followed by 2 counts of $t_{step}$ where the LLC converter 100 switches at $f_{LLCburst}$, followed by 2 counts of $t_{step}$ at the end of the predefined burst on-time $t_{burston}$ where there is a fast frequency ramp up from $f_{LLCburst}$ to $f_{LLCsoftstopburstinitial}$. FIG. 3 illustrates just one example for $n_1$, $n_2$ and $n_3$. Each interval $n_1$, $n_2$ and $n_3$ may have more or less than 2 counts of $t_{step}$. In general, $n_1 \geq 1$, $n_2 \geq 1$ and $n_3 \geq 1$.

Suitable values for $n_1$, $f_{LLCsoftstartburstinitial}$, $n_3$ and $f_{LLCsoftstopburstinitial}$ can be selected to avoid audible noise emanating from the transformer 118 included in the LLC converter 100, and to avoid hard switching of switch devices Q2 and Q3 included in the LLC converter 100. Hard switching of a power transistor such as a power MOSFET occurs when the drain-to-source voltage is non-zero when the transistor is turned on. Suitable values for $n_2$ and $f_{LLCburstfixed}$ can be selected to ensure optimal energy transfer to the output of the LLC converter 100 (labelled '$V_{o,HB}$' in FIG. 3) such that the output voltage ripple and dynamic response of the LLC converter 100 are within the requirements for the power supply at an input voltage of $V_{bus,Brst}$ and a specified load condition (e.g. at an output load of 152 mW). That is, the low power standby mode may have a defined input power consumption level, a defined output voltage ripple level and a defined output voltage response level when exiting the standby mode. Suitable values for $n_2$ and $f_{LLCburstfixed}$ can be selected chosen so that the defined output voltage ripple level and the defined output voltage response level are met during the predefined burst on-time for a specified input voltage condition and a specified load condition and without saturating the secondary-side control loop of the LLC converter 100.

The frequency value $f_{LLCburstfixed}$ is the default switching frequency for $f_{LLCburst}$ in burst mode. In one embodiment, $f_{LLCsoftstartburstinitial}$ and $f_{LLCsoftstopburstfinal}$ are higher than $f_{LLCburst}$. As shown in FIG. 3, $f_{LLCsoftstopburstfinal}$ is higher than $f_{LLCburst}$ and may be lower than $f_{LLCsoftstartburstinitial}$.

The values for $n_1$, $f_{LLCsoftstartburstinitial}$, $n_2$, $f_{LLCburstfixed}$, $n_3$ and $f_{LLCsoftstopburstfinal}$ can be programmed. Default values for the frequency levels and n values can be used and which are optimized for certain standby power conditions e.g. 160 mW or 300 mW and optimized for different LLC designs. If the input and/or output conditions change, the values can be changed accordingly, particularly for high input voltage and light-load conditions. In one embodiment, the configuration and calibration circuit 112 has several default conditions to select from, and the values of $n_1$, $f_{LLCsoftstartburstinitial}$, $n_2$, $f_{LLCburstfixed}$, $n_3$ and $f_{LLCsoftstopburstfinal}$ can be changed.

With optimal energy transfer to the LLC converter output, the standby power consumption and output voltage ripple requirements at the specified load condition can be met. In addition, the secondary-side control is not saturated, which leads to faster dynamic response to load changes and lower standby power losses in the secondary-side circuitry.

Figure 4:
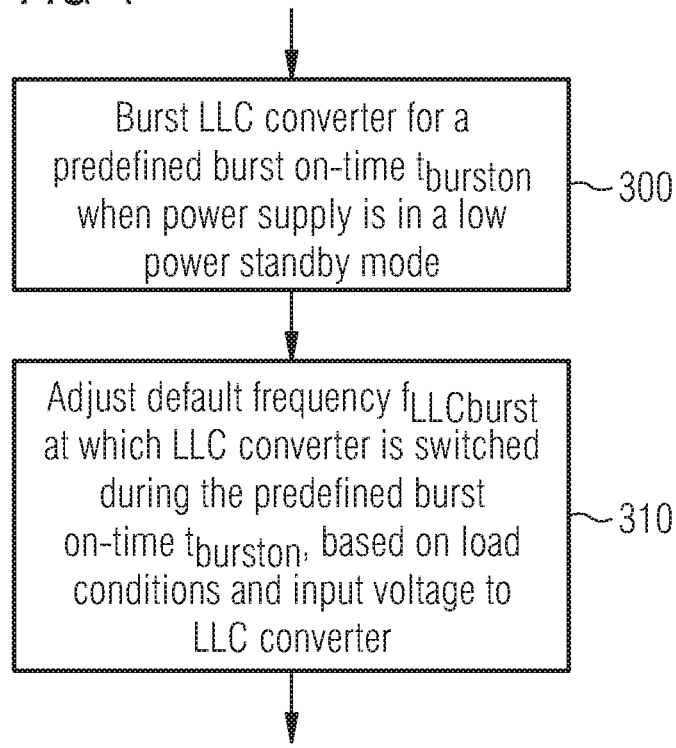
FIG. 4 illustrates a flow diagram of an embodiment of an adaptive LLC burst frequency adjustment technique of the low power standby mode control methodology.

FIG. 4 illustrates the adaptive LLC burst frequency adjustment technique implemented by the controller 106. If the default switching frequency $f_{LLCburstfixed}$ for the LLC converter 100 is used at higher input voltage and/or lighter load conditions where the gain of the LLC converter is lower, the output voltage ripple of the LLC converter 100 may be larger and the secondary-side control loop may saturate due to higher energy transfer to the LLC converter output. Also, the output voltage ripple may fail to meet the output voltage ripple requirement for the power supply. In addition, the saturated secondary-side control loop may cause the power supply to take longer time in responding to load changes and has a higher standby power loss.

The adaptive LLC burst frequency adjustment technique adapts the burst frequency $f_{LLCburst}$ of the LLC converter 100 for different input voltage and load conditions. This way, the switching frequency $f_{LLCburst}$ of the LLC converter 100 in burst mode need not always be set to the default frequency $f_{LLCburstfixed}$ but instead can vary as a function of input voltage and load conditions. In burst mode, the controller 106 bursts the LLC converter 100 for a predefined burst on-time $t_{burston}$ and at a default frequency $f_{LLCburstfixed}$ (Block 300). The adaptive LLC burst frequency unit 116 of the controller 106 adjusts the frequency $f_{LLCburst}$ at which the LLC converter 100 is switched during the predefined burst on-time $t_{burston}$, based on load conditions and the input voltage to the LLC converter 100 (Block 310).

In one embodiment, the burst mode switching frequency $f_{LLCburst}$ of the LLC converter 100 is adjusted using a closed-loop feedback mechanism. The closed-loop feedback mechanism adjusts $f_{LLCburst}$ so that the burst-off time $t_{burstoff}$ following the predefined burst on-time $t_{burston}$ and during which the LLC converter 100 is not being switched in the low power standby mode is at or near a target burst-off time $t_{burstofftarget}$. The adaptive LLC burst frequency closed-loop feedback mechanism can be implemented by hysteresis control, integral control, proportional-integral control, etc.

In some embodiments, the closed-loop feedback mechanism is triggered when the burst-off time $t_{burstoff}$ exceeds a certain threshold $t_{burstoffadapstart}$ so that the burst frequency $f_{LLCburst}$ of the LLC converter 100 is adjusted only under higher input voltage and lighter load conditions and is not adjusted under typical input voltage of $V_{bus,Brst}$ and standby load conditions (e.g. at an output load of 152 mW). Under higher input voltage and lighter load conditions where the gain of the LLC converter 100 is lower, the default burst frequency $f_{LLCburstfixed}$ will deliver too much energy to the LLC converter output and leads to larger output voltage ripple and longer burst-off time. Under such conditions, the adaptive LLC burst frequency adjustment technique implemented by the controller 106 can adjust the LLC burst frequency $f_{LLCburst}$ a higher value than the default burst frequency $f_{LLCburstfixed}$ so that the LLC converter 100 operates at or near an operating point where the LLC gain is lower. This way, the frequency $f_{LLCburst}$ at which the LLC converter 100 is switched during the predefined burst on-time $t_{burston}$ is increased only under higher input voltage and lighter load conditions where gain of the LLC converter 100 is lower and not increased under lower input voltage and higher load conditions where gain of the LLC converter 100 is higher.

In general, the LLC burst frequency $f_{LLCburst}$ can be adapted for different input voltage and load conditions to ensure optimal energy transfer to the output. Moreover, the adaptive LLC burst frequency adjustment technique implemented by the controller 106 accommodates different resonant component tolerances as the LLC burst frequency $f_{LLCburst}$ is adapted accordingly.

In one embodiment, the controller 106 implements the adaptive LLC burst frequency adjustment technique using hysteresis control. According to this embodiment, the initial value of the burst frequency $f_{LLCburst}$ of the LLC converter 100 is set to the default value $f_{LLCburstfixed}$. The adaptive LLC burst frequency unit 116 of the controller 106 adapts $f_{LLCburst}$ in steps of $f_{step}$. The adaptive LLC burst frequency unit 116 increases the LLC burst frequency $f_{LLCburst}$ by $f_{step}$ when the burst-off time $t_{burstoff}$ is greater than the target burst-off time $t_{burstofftarget}$. The adaptive LLC burst frequency unit 116 decreases the LLC burst frequency $f_{LLCburst}$ by $f_{step}$ when the burst-off time $t_{burstoff}$ is less than $t_{burstoffadapstart}$. If the LLC burst frequency $f_{LLCburst}$ is decreased to less than $f_{LLCburstfixed}$, the adaptive LLC burst frequency unit 116 limits the LLC burst frequency $f_{LLCburst}$ to $f_{LLCburstfixed}$ to avoid overly high LLC system gain.

According to another embodiment, the LLC switching period $T_{LLCburst}$ is adjusted instead of the LLC switching frequency $f_{LLCburst}$. The LLC switching period $T_{LLCburst}$ is an alternative way to represent the LLC switching frequency $f_{LLCburst}$ in a digital implementation. The LLC switching period $T_{LLCburst}$ can be determined in counts $T_c$ of the system clock period $T_{clk}$, where $f_{LLCburst}=1/T_{LLCburst}$ and $T_{LLCburst}=T_c*T_{clk}$. The initial value of the LLC burst period $T_{LLCburst}$ is the default value $T_{LLCburstfixed}$, where $T_{LLCburstfixed}=T_{cfixed}*T_{clk}=1/f_{LLCburstfixed}$. The adaptive LLC burst frequency unit 116 of the controller 106 effectively adapts $f_{LLCburst}$ by increasing/decreasing $T_c$ in steps of m. The adaptive LLC burst frequency unit 116 increases the LLC burst frequency $f_{LLCburst}$ by decreasing $T_c$ by m counts when the burst-off time $t_{burstoff}$ is greater than the target burst-off time $t_{burstofftarget}$. The adaptive LLC burst frequency unit 116 effectively decreases the LLC burst frequency $f_{LLCburst}$ by increasing $T_c$ by m counts when the burst-off time $t_{burstoff}$ is lesser than $t_{burstoffadapstart}$. If $T_c$ is higher than $T_{cfixed}$, the adaptive LLC burst frequency unit 116 limits $T_c$ to $T_{cfixed}$ to avoid overly high LLC system gain.

Figure 5:
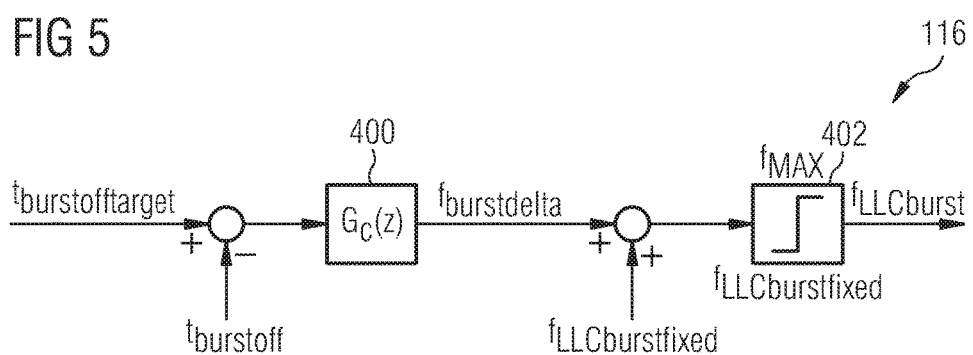
FIG. 5 illustrates a block diagram of an embodiment of the adaptive LLC burst frequency adjustment technique.

FIG. 5 illustrates an embodiment in which the adaptive LLC burst frequency unit 116 of the controller 106 implements the adaptive LLC burst frequency adjustment technique using integral (I) or proportional-integral (PI) control. The closed-loop feedback mechanism is triggered when the burst-off time $t_{burstoff}$ exceeds a certain threshold $t_{burstoffadapstart}$. The adaptive LLC burst frequency unit 116 adapts $f_{LLCburst}$ by adding a delta frequency $f_{burstdelta}$, which can be positive or negative, to $f_{LLCburstfixed}$. The initial value of the LLC burst frequency $f_{LLCburst}$ is the default value $f_{LLCburstfixed}$. A feedback controller $G_c(z)$ 400, which can be an integrator (I) or a proportional-integral (PI) control, adjusts $f_{LLCburst}$ so that the burst-off time $t_{burstoff}$ is at or near the target burst-off time $t_{burstofftarget}$. A delta frequency $f_{burstdelta}$ is computed by the feedback controller $G_c(z)$ 400 based on the difference between $t_{burstofftarget}$ and $t_{burstoff}$. The burst switching frequency $f_{LLCburst}$ of the LLC converter 100 is given by the sum of $f_{burstdelta}$ and $f_{LLCburstfixed}$. If the LLC burst frequency $f_{LLCburst}$ is less than $f_{LLCburstfixed}$, a limiter 402 with maximum value $f_{MAX}$ and minimum value $f_{LLCburstfixed}$ limits the LLC burst frequency $f_{LLCburst}$ to $f_{LLCburstfixed}$ to avoid overly high LLC system gain.

Figure 6:
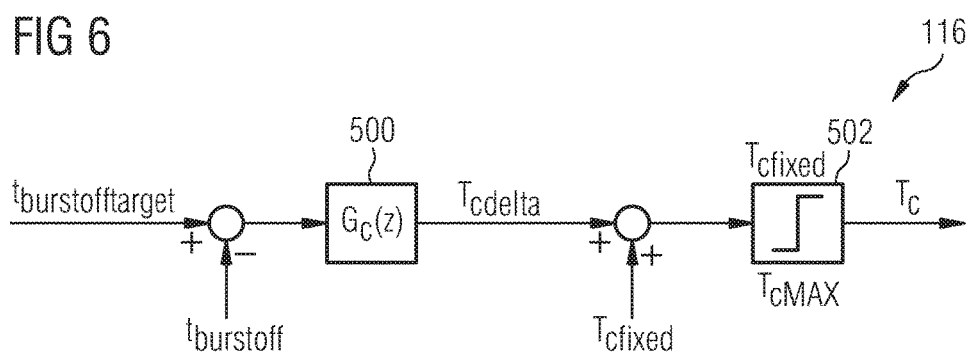
FIG. 6 illustrates a block diagram of another embodiment of the adaptive LLC burst frequency adjustment technique.

FIG. 6 illustrates another embodiment of the integral (I) or proportional-integral (PI) control implementation of the adaptive LLC burst frequency adjustment technique. An alternative way to represent the burst mode switching frequency $f_{LLCburst}$ of the LLC converter 100 in digital implementation is the switching period $T_{LLCburst}$ in counts $T_c$ of system clock period $T_{clk}$, where $f_{LLCburst}=1/T_{LLCburst}$ and $T_{LLCburst}=T_c*T_{clk}$ as explained above. The adaptive LLC burst frequency unit 116 of the controller 106 adapts $f_{LLCburst}$ by adding a delta count $T_{cdelta}$, which can be positive or negative, to $T_{cfixed}$. The initial value of the LLC burst period $T_{LLCburst}$ is the default value $T_{LLCburstfixed}$, where $T_{LLCburstfixed}=T_{cfixed}*T_{clk}=1/f_{LLCburstfixed}$. A feedback controller $G_c(z)$ 500, which can be an integrator (I) or a proportional-integral (PI) control, adjusts $T_c$ value so that the burst-off time $t_{burstoff}$ is at or near the target burst-off time $t_{burstofftarget}$. A delta count $T_{cdelta}$ is computed by the feedback controller $G_c(z)$ 500 based on the difference between $t_{burstofftarget}$ and $t_{burstoff}$. The burst switching period $T_c$ of the LLC converter 100 is given by the sum of $T_{cdelta}$ and $T_{cfixed}$. If $T_c$ is higher than $T_{cfixed}$, a limiter 502 with minimum value $T_{cMAX}$ and maximum value $T_{cfixed}$ limits $T_c$ to $T_{cfixed}$ to avoid overly high LLC system gain.

The low power standby mode control methodology described herein achieves low output voltage ripple in low power standby mode under all input voltage and load conditions. Low standby power consumption is achieved under all input voltage and load conditions. Fast dynamic response to load changes is achieved under all input voltage and load conditions. The standby power consumption, output voltage ripple and dynamic response at a specified load condition (e.g. at an output load of 152 mW) can be optimized by selection of $n_2$ and $f_{LLCburstfixed}$ values. Under higher input voltage and lighter load conditions, the requirements placed on the power supply can be met by optimizing the speed of the adaptive LLC burst frequency adjustments. The low power standby mode control methodology can withstand resonant component tolerances as the LLC burst frequency $f_{LLCburst}$ can be adapted accordingly.

According to an embodiment of a method of operating a power supply that includes a PFC (power factor correction) circuit and an LLC converter, the method comprises bursting the LLC converter for a predefined burst on-time when the power supply is in a low power standby mode. Bursting the LLC converter for the predefined burst on-time comprises: decreasing a switching frequency of the LLC converter from a first frequency value to a second frequency value over one or more fixed time intervals at the beginning of the predefined burst on-time; switching the LLC converter at the second frequency value over one or more of the fixed time intervals after decreasing the switching frequency; and increasing the switching frequency of the LLC converter from the second frequency value to a third frequency value over one or more of the fixed time intervals at the end of the predefined burst on-time.

According to an embodiment, the first and the third frequency values are higher than the second frequency value.

According to an embodiment, the first frequency value, a number of the fixed time intervals over which the switching frequency of the LLC converter is decreased from the first frequency value to the second frequency value at the beginning of the predefined burst on-time, the third frequency value, and a number of the fixed time intervals over which the switching frequency of the LLC converter is increased from the second frequency value to the third frequency value at the end of the predefined burst on-time are chosen to avoid audible noise emanating from a transformer included in the LLC converter and to avoid hard switching of switch devices included in the LLC converter.

According to an embodiment, the low power standby mode has a defined input power consumption level, a defined output voltage ripple level and a defined output voltage response level when exiting the standby mode, and wherein the second frequency value and a number of the fixed time intervals over which the LLC converter is switched at the second frequency during the predefined burst on-time are chosen so that the defined output voltage ripple level and the defined output voltage response level are met during the predefined burst on-time for a specified input voltage condition and a specified load condition and without saturating a secondary-side control loop of the power supply.

According to an embodiment, the method further comprises bursting the PFC circuit synchronously with the LLC converter for the same predefined burst on-time as the LLC converter in the low power standby mode, if an input voltage of the PFC circuit is lower than an output voltage of the PFC circuit.

According to an embodiment, the method further comprises adjusting the second frequency value at which the LLC converter is switched during the predefined burst on-time, based on load conditions and an input voltage to the LLC converter.

According to an embodiment, adjusting the second frequency value based on the load conditions and the input voltage to the LLC converter comprises adjusting the second frequency value so that a burst-off time following the predefined burst on-time and during which the LLC converter is not being switched in the low power standby mode is at or near a target burst-off time.

According to an embodiment, adjusting the second frequency value so that the burst-off time is at or near the target burst-off time comprises increasing the second frequency value if the burst-off time exceeds a burst-off time threshold, so that the second frequency value is increased only under higher input voltage and lighter load conditions where gain of the LLC converter is lower and not increased under lower input voltage and higher load conditions where gain of the LLC converter is higher.

According to an embodiment, adjusting the second frequency value so that the burst-off time is at or near the target burst-off time comprises: increasing the second frequency value by a defined frequency step or decreasing a switching period that corresponds to the second frequency value by a defined time step, if the burst-off time is greater than the target burst-off time; and decreasing the second frequency value by the defined frequency step or increasing the switching period by the defined time step, if the burst-off time is less than a predefined burst-off time.

According to an embodiment, the method further comprises limiting the second frequency value to a predefined burst mode switching frequency for a specified input voltage condition and a specified load condition.

According to an embodiment, adjusting the second frequency value so that the burst-off time is at or near the target burst-off time comprises: computing a delta frequency value or a delta switching period value based on the difference between the burst-off time and the target burst-off time via a closed-loop feedback control using a proportional-integral or integral controller; and adding the delta frequency value to a predefined burst mode switching frequency or adding the delta switching period value to a predefined burst mode switching period to determine the second frequency value.

According to an embodiment, the method further comprises limiting the second frequency value to the predefined burst mode switching frequency if the sum of the delta frequency value and the predefined burst mode switching frequency is less than the predefined burst mode switching frequency, or if the sum of the delta switching period value and the predefined burst mode switching period is greater than the predefined burst mode switching period.

According to an embodiment of a power supply, the power supply comprises a PFC (power factor correction) circuit, an LLC converter and a controller operable to burst the LLC converter for a predefined burst on-time when the power supply is in a low power standby mode. The controller is operable to burst the LLC converter for the predefined burst on-time by: decreasing a switching frequency of the LLC converter from a first frequency value to a second frequency value over one or more fixed time intervals at the beginning of the predefined burst on-time; switching the LLC converter at the second frequency value over one or more of the fixed time intervals after decreasing the switching frequency; and increasing the switching frequency of the LLC converter from the second frequency value to a third frequency value over one or more of the fixed time intervals at the end of the predefined burst on-time.

According to an embodiment, the controller is operable to burst the PFC circuit synchronously with the LLC converter for the same predefined burst on-time as the LLC converter in the low power standby mode, if an input voltage of the PFC circuit is lower than an output voltage of the PFC circuit.

According to an embodiment, the controller is operable to adjust the second frequency value at which the LLC converter is switched during the predefined burst on-time, based on load conditions and an input voltage to the LLC converter.

According to an embodiment, the controller is operable to adjust the second frequency value so that a burst-off time following the predefined burst on-time and during which the LLC converter is not being switched in the low power standby mode is at or near a target burst-off time.

According to an embodiment, the controller is operable to increase the second frequency value if the burst-off time exceeds a burst-off time threshold, so that the second frequency value is increased only under higher input voltage and lighter load conditions where gain of the LLC converter is lower and not increased under lower input voltage and higher load conditions where gain of the LLC converter is higher.

According to an embodiment, the controller is operable to increase the second frequency value by a defined frequency step or decrease a switching period that corresponds to the second frequency value by a defined time step, if the burst-off time is greater than the target burst-off time, and decrease the second frequency value by the defined frequency step or increase the switching period by the defined time step, if the burst-off time is less than a predefined burst-off time.

According to an embodiment, the controller is operable to limit the second frequency value to a predefined burst mode switching frequency for a specified input voltage condition and a specified load condition.

According to an embodiment, the controller is operable to compute a delta frequency value or a delta switching period value based on the difference between the burst-off time and the target burst-off time via a closed-loop feedback control using a proportional-integral or integral controller, and add the delta frequency value to a predefined burst mode switching frequency or add the delta switching period value to a predefined burst mode switching period to determine the second frequency value.

According to an embodiment, the controller is operable to limit the second frequency value to the predefined burst mode switching frequency if the sum of the delta frequency value and the predefined burst mode switching frequency is less than the predefined burst mode switching frequency, or if the sum of the delta switching period value and the predefined burst mode switching period is greater than the predefined burst mode switching period.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of operating a power supply that includes a PFC (power factor correction) circuit and an LLC converter, the method comprising:
   bursting the LLC converter for a predefined burst on-time and at a default frequency when the power supply is in a low power standby mode; and
   adjusting the frequency at which the LLC converter is switched during the predefined burst on-time, based on load conditions and an input voltage to the LLC converter,
   wherein adjusting the frequency at which the LLC converter is switched during the predefined burst on-time based on load conditions and the input voltage to the LLC converter comprises adjusting the frequency at which the LLC converter is switched during the predefined burst on-time so that a burst-off time following the predefined burst on-time and during which the LLC converter is not being switched in the low power standby mode is at or near a target burst-off time.

2. The method of claim 1, wherein bursting the LLC converter for the predefined burst on-time comprises:
   decreasing the switching frequency of the LLC converter from a first frequency value to a second frequency value over one or more fixed time intervals at the beginning of the predefined burst on-time;
   switching the LLC converter at the second frequency value over one or more of the fixed time intervals after decreasing the switching frequency; and
   increasing the switching frequency of the LLC converter from the second frequency value to a third frequency value over one or more of the fixed time intervals at the end of the predefined burst on-time.

3. The method of claim 2, further comprising:
   limiting the second frequency value to the default frequency for a specified input voltage condition and a specified load condition.

4. The method of claim 1, further comprising:
   bursting the PFC circuit synchronously with the LLC converter for the same predefined burst on-time as the LLC converter in the low power standby mode, if an input voltage of the PFC circuit is lower than an output voltage of the PFC circuit.

5. The method of claim 1, wherein adjusting the frequency at which the LLC converter is switched during the predefined burst on-time so that the burst-off time is at or near the target burst-off time comprises:
   increasing the default frequency if the burst-off time exceeds a burst-off time threshold, so that the frequency at which the LLC converter is switched during the predefined burst on-time is increased only under higher input voltage and lighter load conditions where gain of the LLC converter is lower and not increased under lower input voltage and higher load conditions where gain of the LLC converter is higher.

6. The method of claim 1, wherein adjusting the frequency at which the LLC converter is switched during the predefined burst on-time so that the burst-off time is at or near the target burst-off time comprises:

increasing the default frequency by a defined frequency step or decreasing a corresponding switching period, if the burst-off time is greater than the target burst-off time; and decreasing the default frequency by the defined frequency step or increasing the switching period by the defined time step, if the burst-off time is less than a predefined burst-off time.

7. The method of claim 1, wherein adjusting the frequency at which the LLC converter is switched during the predefined burst on-time so that the burst-off time is at or near the target burst-off time comprises:

computing a delta frequency value or a delta switching period value based on the difference between the burst-off time and the target burst-off time via a closed-loop feedback control using a proportional-integral or integral controller; and adding the delta frequency value to the default frequency or adding the delta switching period value to a default burst mode switching period, the default burst mode switching period being the inverse of the default frequency.

8. The method of claim 7, further comprising:

limiting the switching frequency of the LLC converter during the predefined burst on-time to the default frequency if the sum of the delta frequency value and the default is less than the default frequency, or if the sum of the delta switching period value and the default burst mode switching period is greater than the default burst mode switching period.

9. A power supply, comprising:
a PFC (power factor correction) circuit;
an LLC converter; and
a controller operable to burst the LLC converter for a predefined burst on-time and at a default frequency when the power supply is in a low power standby mode, and adjust the frequency at which the LLC converter is switched during the predefined burst on-time based on load conditions and an input voltage to the LLC converter, wherein the controller is operable to adjust the frequency at which the LLC converter is switched during the predefined burst on-time so that a burst-off time following the predefined burst on-time and during which the LLC converter is not being switched in the low power standby mode is at or near a target burst-off time.

10. The power supply of claim 9, wherein the controller is operable to decrease the switching frequency of the LLC converter from a first frequency value to a second frequency value over one or more fixed time intervals at the beginning of the predefined burst on-time, switch the LLC converter at the second frequency value over one or more of the fixed time intervals after decreasing the switching frequency, and increase the switching frequency of the LLC converter from the second frequency value to a third frequency value over one or more of the fixed time intervals at the end of the predefined burst on-time.

11. The power supply of claim 10, wherein the controller is operable to limit the second frequency value to the default frequency for a specified input voltage condition and a specified load condition.

12. The power supply of claim 9, wherein the controller is operable to burst the PFC circuit synchronously with the LLC converter for the same predefined burst on-time as the LLC converter in the low power standby mode, if an input voltage of the PFC circuit is lower than an output voltage of the PFC circuit.

13. The power supply of claim 9, wherein the controller is operable to increase the default frequency if the burst-off time exceeds a burst-off time threshold, so that the frequency at which the LLC converter is switched during the predefined burst on-time is increased only under higher input voltage and lighter load conditions where gain of the LLC converter is lower and not increased under lower input voltage and higher load conditions where gain of the LLC converter is higher.

14. The power supply of claim 9, wherein the controller is operable to increase the default frequency by a defined frequency step or decreasing a corresponding switching period if the burst-off time is greater than the target burst-off time, and decrease the default frequency by the defined frequency step or increasing the switching period by the defined time step if the burst-off time is less than a predefined burst-off time.

15. The power supply of claim 9, wherein the controller is operable to compute a delta frequency value or a delta switching period value based on the difference between the burst-off time and the target burst-off time via a closed-loop feedback control using a proportional-integral or integral controller, and add the delta frequency value to the default frequency or add the delta switching period value to a default burst mode switching period, the default burst mode switching period being the inverse of the default frequency.

16. The power supply of claim 15, wherein the controller is operable to limit the switching frequency of the LLC converter during the predefined burst on-time to the default frequency if the sum of the delta frequency value and the default is less than the default frequency, or if the sum of the delta switching period value and the default burst mode switching period is greater than the default burst mode switching period.

17. A controller for a power supply that includes a PFC (power factor correction) circuit and an LLC converter, the controller comprising:

an adaptive LLC burst frequency unit operable to burst the LLC converter for a predefined burst on-time and at a default frequency when the power supply is in a low power standby mode, and adjust the frequency at which the LLC converter is switched during the predefined burst on-time based on load conditions and an input voltage to the LLC converter;

a fixed burst-on time unit operable to decrease the switching frequency of the LLC converter from a first frequency value to a second frequency value over one or more fixed time intervals at the beginning of the predefined burst on-time, switch the LLC converter at the second frequency value over one or more of the fixed time intervals after decreasing the switching frequency, and increase the switching frequency of the LLC converter from the second frequency value to a third frequency value over one or more of the fixed time intervals at the end of the predefined burst on-time.

18. A method of operating a power supply that includes a PFC (power factor correction) circuit and an LLC converter, the method comprising:
- bursting the LLC converter for a predefined burst on-time and at a default frequency when the power supply is in a low power standby mode; and
- adjusting the frequency at which the LLC converter is switched during the predefined burst on-time, based on load conditions and an input voltage to the LLC converter,
- wherein bursting the LLC converter for the predefined burst on-time comprises:
  - decreasing the switching frequency of the LLC converter from a first frequency value to a second frequency value over one or more fixed time intervals at the beginning of the predefined burst on-time;
  - switching the LLC converter at the second frequency value over one or more of the fixed time intervals after decreasing the switching frequency; and
  - increasing the switching frequency of the LLC converter from the second frequency value to a third frequency value over one or more of the fixed time intervals at the end of the predefined burst on-time.

19. The method of claim 18, further comprising:
- limiting the second frequency value to the default frequency for a specified input voltage condition and a specified load condition.

20. A method of operating a power supply that includes a PFC (power factor correction) circuit and an LLC converter, the method comprising:
- bursting the LLC converter for a predefined burst on-time and at a default frequency when the power supply is in a low power standby mode;
- adjusting the frequency at which the LLC converter is switched during the predefined burst on-time, based on load conditions and an input voltage to the LLC converter; and
- bursting the PFC circuit synchronously with the LLC converter for the same predefined burst on-time as the LLC converter in the low power standby mode, if an input voltage of the PFC circuit is lower than an output voltage of the PFC circuit.

21. A power supply, comprising:
- a PFC (power factor correction) circuit;
- an LLC converter; and
- a controller operable to:
  - burst the LLC converter for a predefined burst on-time and at a default frequency when the power supply is in a low power standby mode;
  - adjust the frequency at which the LLC converter is switched during the predefined burst on-time based on load conditions and an input voltage to the LLC converter;
  - decrease the switching frequency of the LLC converter from a first frequency value to a second frequency value over one or more fixed time intervals at the beginning of the predefined burst on-time;
  - switch the LLC converter at the second frequency value over one or more of the fixed time intervals after decreasing the switching frequency; and
  - increase the switching frequency of the LLC converter from the second frequency value to a third frequency value over one or more of the fixed time intervals at the end of the predefined burst on-time.

22. The power supply of claim 21, wherein the controller is operable to limit the second frequency value to the default frequency for a specified input voltage condition and a specified load condition.

23. A power supply, comprising:
- a PFC (power factor correction) circuit;
- an LLC converter; and
- a controller operable to burst the LLC converter for a predefined burst on-time and at a default frequency when the power supply is in a low power standby mode, and adjust the frequency at which the LLC converter is switched during the predefined burst on-time based on load conditions and an input voltage to the LLC converter,
- wherein the controller is operable to burst the PFC circuit synchronously with the LLC converter for the same predefined burst on-time as the LLC converter in the low power standby mode, if an input voltage of the PFC circuit is lower than an output voltage of the PFC circuit.

* * * * *